Aug. 12, 1947.　　U. U. SAVOLAINEN　　2,425,687
COMPENSATING THERMOSTAT
Filed Nov. 3, 1943

Unto U. Savolainen,
Inventor.
Haynes and Koenig
Attorneys.

Patented Aug. 12, 1947

2,425,687

UNITED STATES PATENT OFFICE 2,425,687

COMPENSATING THERMOSTAT

Unto U. Savolainen, Attleboro, Mass., assignor to Metals & Controls Corporation, Attleboro, Mass., a corporation of Massachusetts Application November 3, 1943, Serial No. 508,801

3 Claims. (Cl. 297—16)

1

This invention relates to thermostats, and with regard to certain more specific features, to double-helix, bimetal thermostats such as exemplified in Parsons U. S. Patent 2,121,259.

Among the several objects of the invention may be noted the provision of a simple means for counteracting the relative angular operating movements that occur between opposite ends of a plain double-helix thermostat intended to operate axially and which will avoid manufacturing difficulties and the necessity for complex calculations in design; the provision of a thermostat of the class described which compensates with equal simplicity either when the thermostat operates axially expansively or contractively upon heating; and the provision of means of the class described which may also be arranged to compensate axially while operating by angular twisting. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated two of various possible embodiments of the invention, Fig. 1 is a plan view being a horizontal section taken on line 1—1 of Fig. 2;

Similar reference characters indicate corresponding parts throughout the several views of the drawings.

The double-helix, bimetallic thermostat shown in the Parsons patent, above-mentioned, upon temperature change produces some rotary action between its opposite ends which accompanies the desired axial linear motion. If this action is resisted undesirable stresses and distortion are set up and undesirable friction set up in the associated apparatus.

One means of overcoming the above-mentioned undesirable angular action is to wind the end of the bimetal strip of the double helix coil into a simple helix extending from the double helix with its axis coincident with the major axis of the double helix, and with the high and low expansion side of the strip and direction of winding such that this plain helix counteracts the angular rotation of the double helix. This is not

2 a desirable solution to the problem due to the manufacturing difficulties and the relatively complex calculations involved in producing devices to meet different required operating conditions. Furthermore it will not produce rotary action with axial compensation as will the present device under certain conditions to be described.

Or, the angular rotation may be made innocuous by employing a rotary fastening at one or both ends, but such fastenings are generally impractical if not impossible to install in many applications, particularly the smaller ones.

The present invention utilizes the inherent properties of the double helix coil itself to achieve compensation for angular rotation, and in such a way that designing devices for particular applications is practically as simple as designing the old non-compensated, double helix thermostats.

Figure 1:
Figure 2:
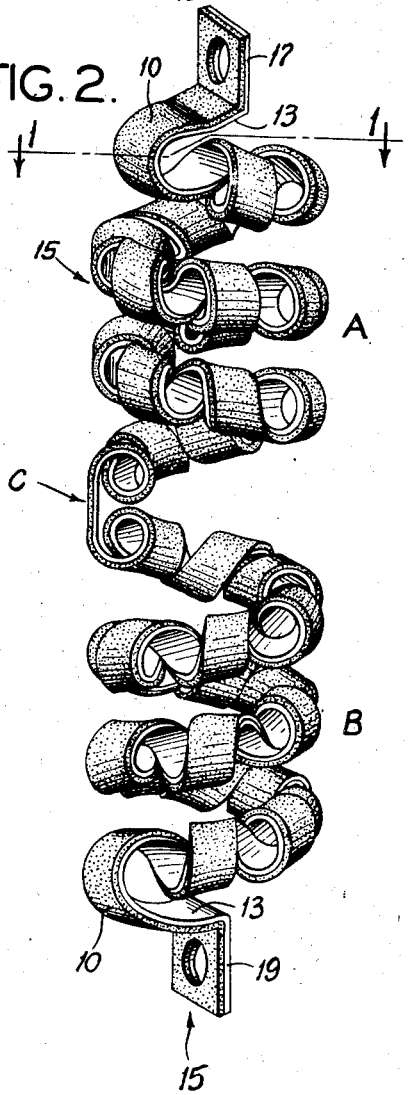
Fig. 2 is a side elevation of one form of the invention.

Referring now more particularly to Figs. 1 and 2 of the drawings, numerals 10 and 13 indicate the two joined components of an ordinary bimetallic thermostatic strip 15. The materials constituting the components 10 and 13 have different coefficients of expansion. Between its ends 17 and 19, this strip 15, which is preferably of constant width and thickness throughout, is wound as a double helix coil having two sections A and B. Tracing the strip 15 from the bottom end 19 toward the top end 17 (Fig. 2), it will be seen that its primary helix is wound or coiled counterclockwise throughout the section B and clockwise throughout the section A. By primary helix is meant the smaller one which constitutes the winding of the strip around a center line which itself is disposed as a larger helix, hereinafter referred to as the secondary helix. The coiling of the smaller primary helix as a whole is coiled on this larger secondary helix.

Viewed from the bottom in Fig. 2 this secondary larger helix is coiled clockwise in section B and counterlockwise in section A.

The junction between the sections A and B is indicated at C, the same being arranged in Fig. 2 to bring about the reversal of winding or coiling of the primary helix above described. That is, the juncture C is more or less C-shaped. The juncture may comprise a continuation of one strip as shown, or be constituted by a brazed, riveted, spot-welded or soldered construction.

The general cylindric device, considered as a whole, will either expand longitudinally in response to heating, or contract, depending upon whether the bimetallic element of high coefficient of expansion is outside or inside of the primary helix winding. In Figs. 1 and 2, the high expansion element is outside (as indicated by stippling), and the low expansion element is inside, which results in axial contracting or so-called closing movement with temperature increase.

However, change in temperature will not bring about angular movement between the ends 17 and 19, provided that the number of equal-sized primary and secondary helix loops in sections A and B are approximately the same, and, provided the length, width, thickness and activity of the composite strip used is substantially the same in each section A and B. The device may be designed for any given desired contraction (or expansion as will be shown), in response to a given temperature change by varying the total sum of loops used in two sections A and B. The other usual design factors of course are to be considered, such as the force required for a given installation, which depends upon the thickness and width of the bimetallic strip and upon the diameters of the primary and secondary helices. But none of the latter requirements is inconsistent with an equality of the numbers of loops in sections A and B in order to obtain complete angular compensation.

Figure 3:
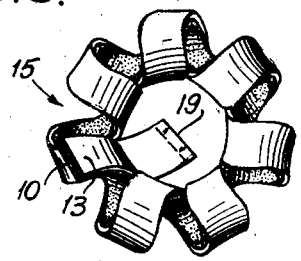
Fig. 3 is a plan view being a horizontal section taken on line 3—3 of Fig. 4; and, Fig. 4 is a view similar to Fig. 2 showing another form of the invention.
Figure 4:
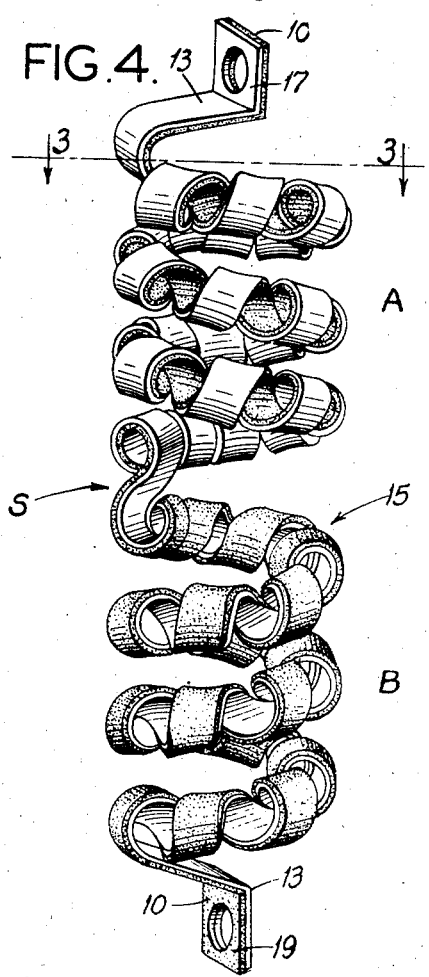

In Figs. 3 and 4 is shown another form of the invention in which like numerals designate like parts, but in this case the juncture between sections A and B is made as a reverse S-shape. Thus in this case, viewed from the bottom, the primary windings in section B are again counterclockwise (as in Fig. 2) and in section A they maintain their counterclockwise winding. The secondary helices in Fig. 4 are again clockwise in section B and counterclockwise in section A.

In Fig. 4 the metal of high coefficient of expansion (stippled) is not on the outside throughout the entire unit. It is on the outside only in section B. In section B the primary helix winding is still left-handed. In section A, the primary helix is still left-handed and the secondary winding is also left-handed. The metal of high coefficient of expansion in section A is on the inside. Thus, upon heating, the Fig. 4 form of the invention again contracts.

In both the forms shown in Figs. 2 and 4, if it were desired to obtain axial elongation with heating, it would only be necessary to reverse the positions of adjacent metals of high and low coefficients of expansion, but leaving the geometry of the figures otherwise the same. In both cases with substantially equal numbers of primary and secondary loops in sections A and B, angular compensation would be accomplished.

In table I below are shown all of the characteristics possible in the respective sections (whether A or B), together with the resulting activity obtained in a given section:

its ends which is either clockwise or counterclockwise. Organization of two coils into connected sections A and B to obtain compensation for angular rotation is accomplished by coupling two coils which give the same linear motions but opposite angular motions. Each coil will produce one-half of the linear motion desired. The angular rotation introduced at the juncture by one coil is compensated for by the other, whereby the ends are automatically compensated against relative angular movement. Or, stated otherwise, the juncture is required to move and this may occur without application of rotative forces to the ends 17, 19.

If it be assumed that coil sections A and B are of the same material, length, width and thickness, then the angular rotation of one coil in one section is opposite to, and equals, that of the other coil in the connected section, and relative rotation between the ends of the entire combination is eliminated.

The double-coil combinations (by numbers) from Table I which will compensate for angular rotation but which will provide for axial contraction (closing) with temperature rise are:

*Table II*

3–8 (shown in Fig. 4)
3–2 (shown in Fig. 2)
5–8
5–2

The double-coil combinations (by numbers) from Table I which will compensate for angular rotation but provide for axial expansion (opening) with temperature rise are:

*Table III*

6–7
6–1
4–7
4–1

It will be clear from the above tables that, in order to obtain an angular compensating combination of sections, one chooses a pair of sections whose angular movements are opposite, that is, clockwise on the one hand and counterclockwise on the other; but the number of choices of these combinations is limited by the condition that a given clockwise-counterclockwise combination is to provide consistent axial movements in both sections, because of course it is not desired to have axial movements also compensate axially. It is these conditions that control the choices shown in Tables II and III. It may be noted that

*Table I*

| Designation | High Expansion Side | Primary Helix, Direction of Winding | Secondary Helix, Direction of Winding | Movement with Temp. Increase | |
|---|---|---|---|---|---|
| | | | | Axial | Angular (looking at end of coil with further end held and advancing to further end) |
| 1 | Outside | Right hand | Right hand | Open | Counterclockwise. |
| 2 | do | do | Left hand | Close | Do. |
| 3 | do | Left hand | Right hand | do | Clockwise. |
| 4 | do | do | Left hand | Open | Do. |
| 5 | Inside | Right hand | Right hand | Close | Do. |
| 6 | do | do | Left hand | Open | Do. |
| 7 | do | Left hand | Right hand | do | Counterclockwise. |
| 8 | do | do | Left hand | Close | Do. |

As may be seen from the above table, any double helix coil for one of the sections A or B can be made either to expand (open) or contract (close) with temperature increase, and in either of these cases, to have relative rotation between its ends which is either clockwise or counterclockwise. Organization of two coils into connected sections A and B to obtain compensation the secondary (large) helices are always wound opposite, but where the primary helices are wound oppositely in the respective sections A and B, the high and low expansion sides of the strip should be made either inside or outside both sections.

Conversely, when the primary helices are wound the same in the respective sections A and B, the high and low expansion sides of the strip must be located relatively oppositely in these respective sections. In other words, one must either reverse the relationship of strip components in the respective sections A and B, or the direction of winding of the primary helices, while always maintaining a reverse winding of the secondary helices. These then are the conditions for rotary compensating action, in addition to equality in length of strip in the respective sections.

Another point should be noted, namely, that by a proper choice of coils in the sections A and B axial compensation of motion can be attained with additive rotary control action. In this case Table I is entered to choose compensating axial combinations and additive angular combinations.

The double-coil combinations (by number) from Table I, which will compensate for axial movements but which will provide for additive clockwise rotation by temperature rise are:

Table IV 3-4
4-5
3-6
5-6

The double-coil combinations (by number) from Table I which will compensate for axial movement but provide for additive counterclockwise rotation with temperature rise are:

Table V 1-2
7-8
1-8
2-7

It may be noted that in the case of axial compensation the secondary (large) helixes are again always wound opposite, but the relationship between the high expansion and low expansion metals is always the same in both sections A and B, as is also the direction of winding of the primary helices therein.

It is clear that, by making the length of strip different used in the different sections A and B, various degrees of compensation may be obtained without complete compensation, should this be desirable. In practice this would result in a different number of primary and secondary helical loops in one of the sections A or B, with respect to the number of primary or secondary helical loops in the other section B or A, respectively. Also, various degrees of compensation, including complete compensation may be obtained by shifting of various factors in the respective sections A and B, such as numbers and diameters of coils in the respective sections, and widths and thicknesses of the bimetallic strips used in the respective sections.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A thermostatic control member comprising two double helical sections, each of said sections comprising a bimetallic strip twisted to form a primary helix which is coiled as a secondary helix, said sections being joined endwise in substantial coaxial relationship, each of said sections being adapted for relative longitudinal movement and relative angular movement of its ends upon temperature change, the coils of the secondary helix in one of said sections being wound in the opposite direction to the coils in the other section, the direction of winding of the primary helices and the inside-outside relationship of the components of high and low coefficients of expansion in each of said sections being such that one of said movements of one section compensates for the corresponding movement of the other section while the other movement of one section is additive to the corresponding movement of the other section.

2. A thermostatic control member comprising two double helical sections, each of said sections comprising a bimetallic strip twisted to form a primary helix which is coiled as a secondary helix, said sections being joined endwise in substantial coaxial relationship, each of said sections being adapted for relative longitudinal movement and relative angular movement of its ends upon temperature change, the coils of the secondary helix in one of said sections being wound in the opposite direction to the coils in the other section, the direction of winding of the primary helices and the inside-outside relationship of the components of high and low coefficients of expansion in each of said sections being such that angular movement of one section compensates for angular movement of the other while longitudinal movement of one section is additive to longitudinal movement of the other.

3. A thermostatic control member comprising two double helical sections, each of said sections comprising a bimetallic strip twisted to form a primary helix which is coiled as a secondary helix, said sections being joined endwise in substantial coaxial relationship, each of said sections being adapted for relative longitudinal movement and relative angular movement of its ends upon temperature change, the coils of the secondary helix in one of said sections being wound in the opposite direction to the coils in the other sections, the direction of winding of the primary helices and the inside-outside relationship of the components of high and low coefficients of expansion in each of said sections being such that one of said movements of one section compensates for the corresponding movement of the other section while the other movement of one section is additive to the corresponding movement of the other section, the number of primary and secondary coils in each section being substantially equal, and the width and thickness of the strip in both sections being the same for complete compensation.

UNTO U. SAVOLAINEN.

REFERENCES CITED

The following references are of record in the file of this patent:

UNITED STATES PATENTS

| Number | Name | Date |
|---|---|---|
| 2,298,110 | Crum | Oct. 6, 1942 |
| 2,283,075 | Matthews | May 12, 1942 |

FOREIGN PATENTS

| Number | Country | Date |
|---|---|---|
| 369,001 | Great Britain | Mar. 17, 1932 |